United States Patent [19]

Lynch et al.

[11] Patent Number: 4,773,599
[45] Date of Patent: Sep. 27, 1988

[54] SERIES OF SCREENS FOR A SIZE REDUCTION MACHINE

[75] Inventors: Daniel N. Lynch, Waterloo; Jupiter Muntean, Kitchener, both of Canada

[73] Assignee: Quadro Engineering Incorporated, Waterloo, Canada

[21] Appl. No.: 844,956

[22] Filed: Mar. 27, 1986

[30] Foreign Application Priority Data

Apr. 4, 1985 [CA] Canada .................................. 478525

[51] Int. Cl.⁴ ............................................. B02C 19/00
[52] U.S. Cl. ..................... 241/69; 209/283; 241/74; 241/89.2; 241/258
[58] Field of Search ................. 241/37, 286, 258, 259, 241/259.1, 74, 73, 69, 89.2, 89.3, 86.1, 89.1, 186.2, 186 R, 189 F, 199.7, 199.12; 209/281, 282, 283, 399, 397, 398, 405

[56] References Cited

U.S. PATENT DOCUMENTS

| | | | |
|---|---|---|---|
| 1,203,820 | 11/1916 | Wales | 241/89.3 |
| 1,393,949 | 10/1921 | Lowe | 241/74 |
| 2,732,137 | 1/1956 | Fisher | 241/89.2 |
| 4,605,173 | 8/1986 | Edmonds | 241/74 X |

FOREIGN PATENT DOCUMENTS

| | | | |
|---|---|---|---|
| 121928 | 1/1919 | United Kingdom | 241/89.3 |
| 1036609 | 7/1966 | United Kingdom | |

*Primary Examiner*—Mark Rosenbaum
*Attorney, Agent, or Firm*—Daryl W. Schnurr

[57] ABSTRACT

A series of screens for use with a size reduction machine have a tapered apertured wall formed into a frusto-conical shape, with an open wide end and a narrow closed end. All screens of a particular series have a cylindrical section, the same interior depth, outside diameter and angle of the tapered wall. Despite variations in the material wall thickness, screens of the same series are interchangeable on a size reduction machine and the gap can remain constant without any adjustment to the impeller. Further, a size reduction machine has means external to the machine providing for infinite adjustments to the gap. With previous machines, each time that a screen of a different thickness was used, it was necessary to make an adjustment to the gap in order to maintain the same gap. Further, when an adjustment to the gap is required, that is accomplished by removing the screen and impeller from the machine and inserting spacers onto the shaft.

7 Claims, 7 Drawing Sheets

4,773,599

SERIES OF SCREENS FOR A SIZE REDUCTION MACHINE

BACKGROUND OF THE INVENTION

1. Field of the Invention

This invention relates to size reduction machines and, in particular, to a series of interchangeable screens for use in size reduction machines, without any adjustment in gap size being required and to an apparatus for adjusting the size of a gap between an impeller and a screen.

2. Description of the Prior Art

Previous size reduction machines utilize a frusto-conical shaped screen located in a channel between an input and output. Various screens and impellers are used in the machine depending on the size and type of particles that are being processed. Different screens have apertures of different sizes and shapes. Sometimes, size reduction is accomplished in stages by successively using screens with smaller apertures. The thickness of the material used to construct a particular screen generally varies with the size of the apertures required. Previous screens are made in a conical die in such a manner that the interior height of each screen made on the same die varies with the thickness of material being used. This variation in interior height can result in confusion in operating the size reduction machines as the gap between the impeller and the interior surface of the screen varies when one screen is replaced with a different screen having a different wall thickness. The different wall thickness is compensated for by inserting or removing spacers on the impeller shaft to move the impeller relative to the interior of the screen. However, as a side wall of the screen is tapered relative to the impeller, the actual adjustment of the gap is less than the thickness of the spacer and depends upon the angle of the screen relative to the horizontal. Where the tapered wall of the screen has an angle of 60° relative to the horizontal, the gap is adjusted by one-half the thickness of the spacer. In other words, if it is desired to adjust the gap by 10 mm, a spacer of 20 mm is inserted or removed from the impeller shaft in order to maintain a constant gap. This adjustment of the gap becomes more complicated where it was desired to use a new screen having a different wall thickness and at the same time increase the gap size. Then, a calculation must be done to determine the size of spacer necessary to compensate for the change in wall thickness and also for the desired change in gap size. With previous size reduction machines, it is usually necessary to remove or insert spacers on the impeller shaft whenever a screen having a different wall thickness from the previous screen is used in the machine. If the angle of the tapered wall is something other than 60° the relationship between the gap size and material thickness of the screen can be even more complex.

Further, with previous size reduction machines, difficulties can be encountered in changing the gap size as the change is accomplished by inserting or removing spacers, of an appropriate size, on the impeller shaft. This usually necessitates removing the screen from the machine as well as removing the impeller. A spacer or spacers of appropriate size are then removed from or inserted onto the shaft and the impeller and screen are replaced. Depending on the type of particles that are being processed, the screen and impeller can be very messy, thereby causing additional problems when it is desired to change the gap size. In some uses of size reduction machines, it is desirable to change the gap size without changing the screen. The same procedure as that outlined above for inserting or removing spacers is then followed.

SUMMARY OF THE INVENTION

It is an object of the present invention to provide a series of screens that can interchangeably be used with a size reduction machine, a gap size remaining constant without any adjustment, said screens having different wall thicknesses. It is a further object of the present invention to provide a size reduction machine where the size of the gap can be adjusted externally of the machine.

An interchangeable screen is designed for use with a size reduction machine having an impeller mounted on a rotatable shaft and a power source to rotate said shaft and impeller. The shaft and impeller are located in a channel having an input and output, said channel containing a support. The screen has a tapered apertured wall formed into a frustco-conical shape, with a wide end of said screen being open and a narrow end being at least partially closed. The screen has a substantially cylindrical section which surrounds and extends from said tapered apertured wall. A circular flange surrounds and extends radially outward from said cylindrical section at an end opposite to said tapered wall. The screen is designed to be located in said channel with said flange held rigidly within said support so that any particles passing from said input to said output pass through said screen. The impeller is shaped and mounted so that a gap between an edge of the impeller and a tapered wall of said screen mounted in said support can be maintained substantially constant when said impeller rotates relative to said screen. The screen is independently removable from said machine and replaceable with a replacement screen. The replacement screen has the same outside diameter at a wide end and the same depth as said interchangeable screen despite variations between the screens in height of the cylindrical section, in apertured wall thickness and in size and shape of apertures. The gap is maintained at a constant value, if desired, without any adjustments being made to the impeller.

In a further embodiment, a size reduction machine for reducing the size of particles has an impeller mounted on a rotatable shaft, with a power source to rotate said shaft and impeller. The shaft and impeller are located in a channel having an input and output. A screen has a tapered apertured wall formed into a frusto-conical shape, with a wide end of said screen being open and a narrow end being at least partially closed. The screen has a substantially cylindrical section. A circular flange surrounds and extends outwardly from said wide end. The channel contains a support, said screen being held within said support so that any particles passing from said input to said output pass through said screen. The impeller is shaped and mounted so that a gap between an edge of said impeller and a tapered wall of said screen remain substantially constant as said impeller rotates relative to said screen. The screen is removable from and replaceable in said support.

Further, in accordance with the present invention, a size reduction machine for reducing the size of particles has an impeller mounted on a rotatable shaft and a power source to rotate said shaft and impeller. The shaft and impeller are located in a channel having an input and output, said channel containing a support. A screen has a tapered apertured wall formed into a frusto-conical shape with a wide end of said screen being open and a narrow end being at least partially closed. A circular flange surrounds and extends outwardly from said wide end of said screen. The screen is designed to be located in said channel and held rigidly within said support so that any particles passing from said input to said output pass through said screen. The impeller is shaped and mounted so that a gap between an edge of said impeller and an interior of said screen remains substantially constant as said impeller rotates relative to said screen. At least part of the shaft is rotatably mounted in a spindle housing. The spindle housing is mounted so that its position can be adjusted longitudinally relative to said screen, by means external to said channel.

DESCRIPTION OF A PREFERRED EMBODIMENT

Figure 1:
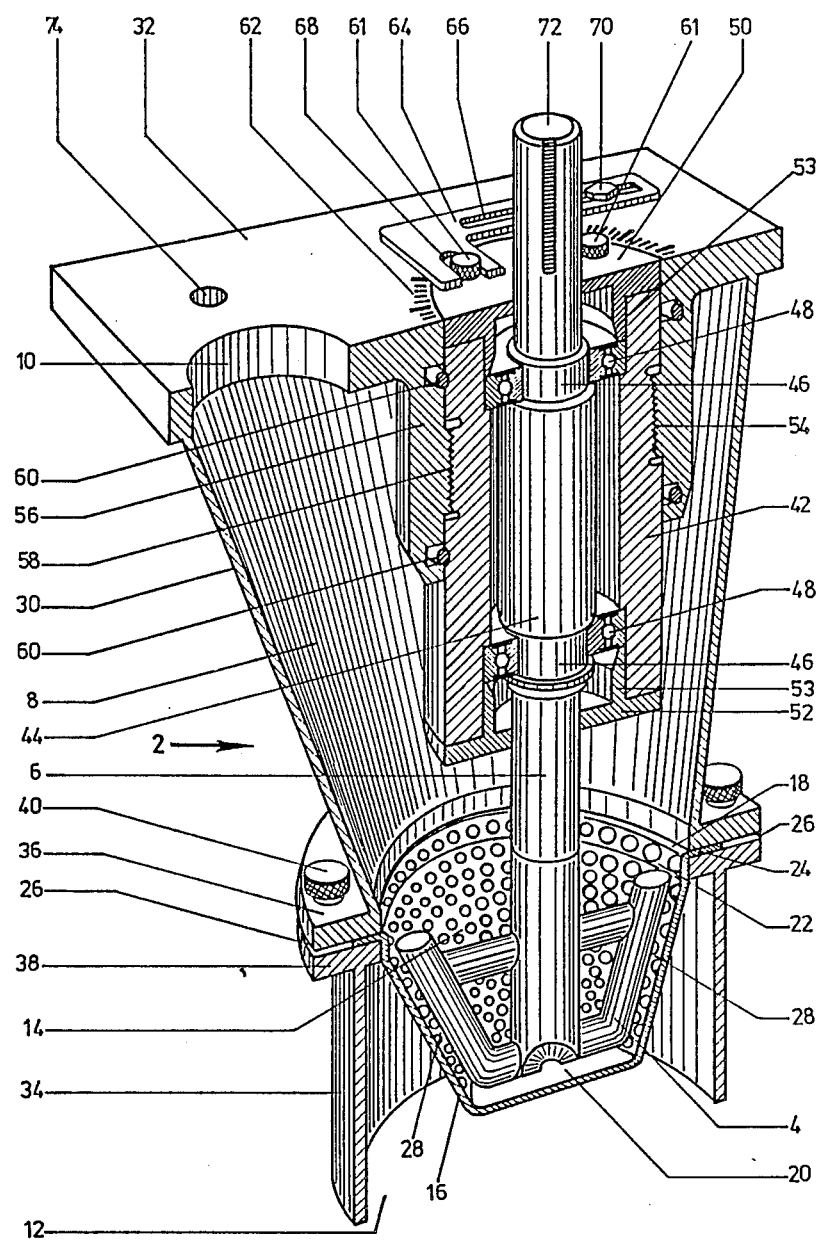
FIG. 1 is a perspective view of a size reduction machine with a front portion of said machine being cut away to expose an interior of said machine.

Referring to the drawings in greater detail, in FIG. 1, there is shown a perspective view of a size reduction machine 2 with a front portion of said machine cut away to expose an interior. The machine 2 has an impeller 4 mounted on a rotatable shaft 6. The shaft 6 and impeller 4 are located in a channel 8 having an input 10 and an output 12. A screen 14 has a tapered apertured wall 16 formed into a frusto-conical shape, with a wide end 18 of said screen being open and a narrow end 20 being at least partially closed. In most uses, it is desirable to have the narrow end 20 completely closed. The screen 14 has a substantially cylindrical section 22 located at said wide end 18. The cylindrical section 22 surrounds and extends from an edge of said tapered wall 16. A circular flange 24 surrounds and extends outwardly from said cylindrical section 22 at a wide end 18 of said screen 14.

The channel 8 contains a support 26 and said screen 14 is held within said support so that any particles passing from said input 10 to said output 12 pass through said screen. The impeller 4 is shaped and mounted so that a gap 28 between an edge of said impeller and a tapered wall of said screen is substantially constant as said impeller rotates relative to said screen.

The channel 8 has a housing 30 with a top cover plate 32 at an upper end and a shroud 34 at a lower end. The housing 30 has a lower end with an opening and a circular flange 36 surrounding said opening and being affixed to said lower end. The shroud 34 has an opening at either end with a circular flange 38 surrounding the opening at an upper end of said shroud 34 and being affixed to said upper end. The flanges 36, 38 of the housing 30 and shroud 34 respectively have a series of corresponding openings therein (not shown) so that bolts 40 can be removably inserted into said openings and tightened with nuts (not shown) so that the flange 24 of the screen 14 can be held rigidly between the flanges 36, 38 of the housing 30 and shroud 34 respectively. The flanges 36, 38 together comprise the support 26. Various other means of supporting the screen will be readily apparent to those skilled in the art. For example, a removable C-clamp tightener could be used as the support 26.

Part of the shaft 6 is rotatably mounted in a spindle housing 42. To facilitate the mounting of the shaft 6 within the spindle housing 42, the shaft 6 has an elongated collar 44 thereon. The collar 44 has narrow ends 46 that are each rotatably mounted in ball bearings 48. The collar 44 and ends 46 are preferably integral with the shaft 6 but could be separate components that are rigidly affixed to said shaft. The ball bearings 48 are seated within the spindle housing 42, thereby allowing the shaft 6 to rotate relative to the spindle housing 42. The spindle housing 42 has end plates 50, 52 at upper and lower ends thereof respectively.

In addition to covering the ends of the spindle housing 42, the end plates 50, 52 each have an annular flange 53 to assist in holding the ball bearing 48 in place within the spindle housing 42.

The spindle housing 42 is mounted so that its location can be adjusted longitudinally relative to said screen by means external to said machine 2 and channel 8. There are also means external to said channel 8 for releasibly locking said spindle housing 42 in a fixed position relative to said screen 14.

The spindle housing 42 has a screw thread 54 on part of an external surface thereof, the spindle housing 42 being concentrically mounted in a sleeve 56. The sleeve 56 has an inner surface with a screw thread 58 thereon corresponding to the screw thread 54 of the spindle housing 42. The sleeve 56 cannot rotate relative to said screen 14 as it is integral with the top cover plate 32. Sealing rings 60 are mounted above and below the screw threads 54, 58 to reduce the possibility of dust or dirt entering the area of said screw threads.

It can readily be seen from FIG. 1 that the upper end plate 50 of the spindle housing 42 is flush with a surface of the top cover plate 32 of the channel 8. Heads of screws 61 are also external to the channel 8. A calibration scale 62 is located on said cover plate 32. An L-shaped retainer 64 has a closed slot 66 and an open slot 68. The retainer 64 is held on the top cover plate 32 by a screw 70 located in the slot 66. When a screw 61 is located in a slot 68 and the screw 70 is tightened so that the retainer 64 cannot move relative to the top cover plate 32, the spindle housing 42 is locked in a fixed position relative to the screen 14. The retainer 64 therefore provides means for releasably locking said spindle housing 42 in a fixed position relative to said screen 14.

As can readily be seen from FIG. 1, an end 72 of the shaft 6 protrudes from the channel 8. A power source (not shown) can easily be attached to the end 72 of the shaft 6 to cause the shaft 6 and impeller 4 to rotate relative to said screen 14. Preferably, the power source is a variable speed electric motor. However, the power source is conventional and many other power sources will be suitable to operate the size reduction machine 2.

The purpose of an opening 74 in the top cover plate 32 of the housing 8 is to affix feed means for said machine 2 to the input 10. A similar opening (not shown) is located on the other side of the input 10.

Figure 2:
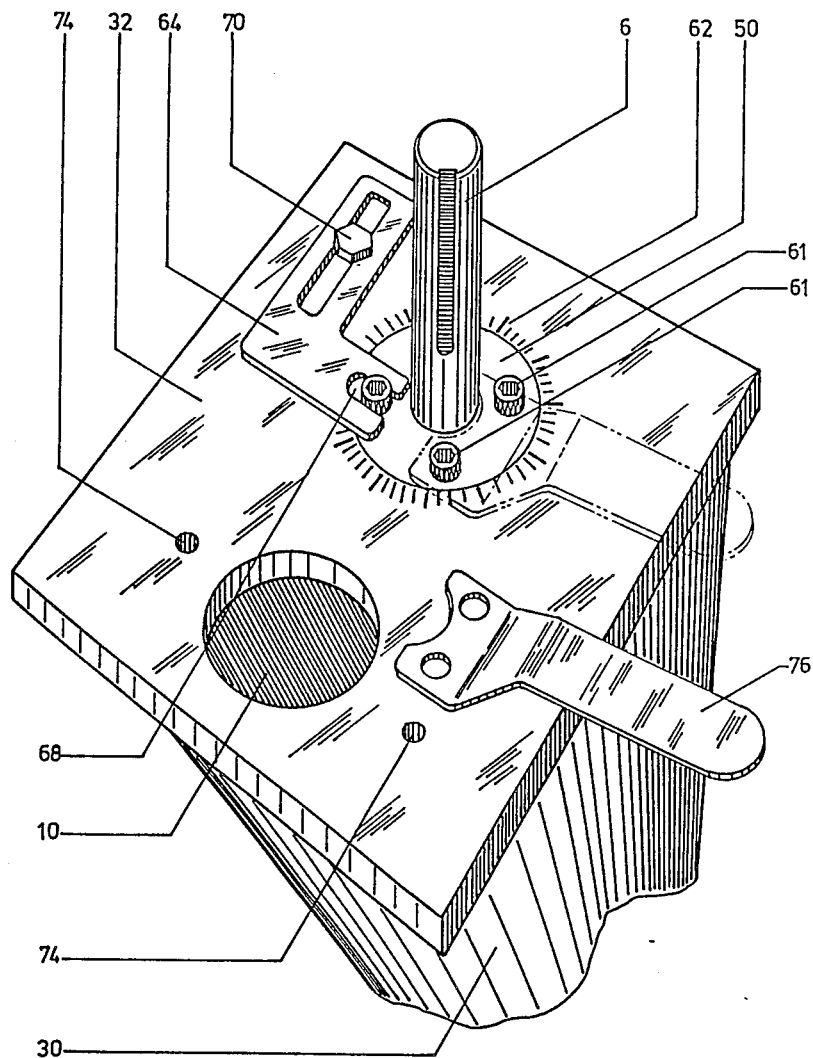
FIG. 2 is a partial top view of the size reduction machine of FIG. 1 with locking means shown in a locked position.

Referring to FIG. 2 in greater detail, when it is desired to adjust the size of the gap 28 of the size reduction machine 2, the screw 70 is loosened so that the retainer 64 can be pivoted away from the shaft 6 so that the screw 61 is no longer located within the slot 68. Next, a wrench 76 can be inserted onto two screws 61 as shown in FIG. 2. The wrench 76 can be turned clockwise to decrease the size of the gap 28 and counterclockwise to increase the size of the gap 28. As the wrench 76 is turned clockwise or counterclockwise, the end plate 50 will no longer be flush with the surface of the top cover plate 32. However, external access to the end plate 50 will still be available. Since the impeller is mounted on the shaft and the shaft is mounted in the spindle housing, the impeller moves longitudinally with the spindle housing.

Figure 3:
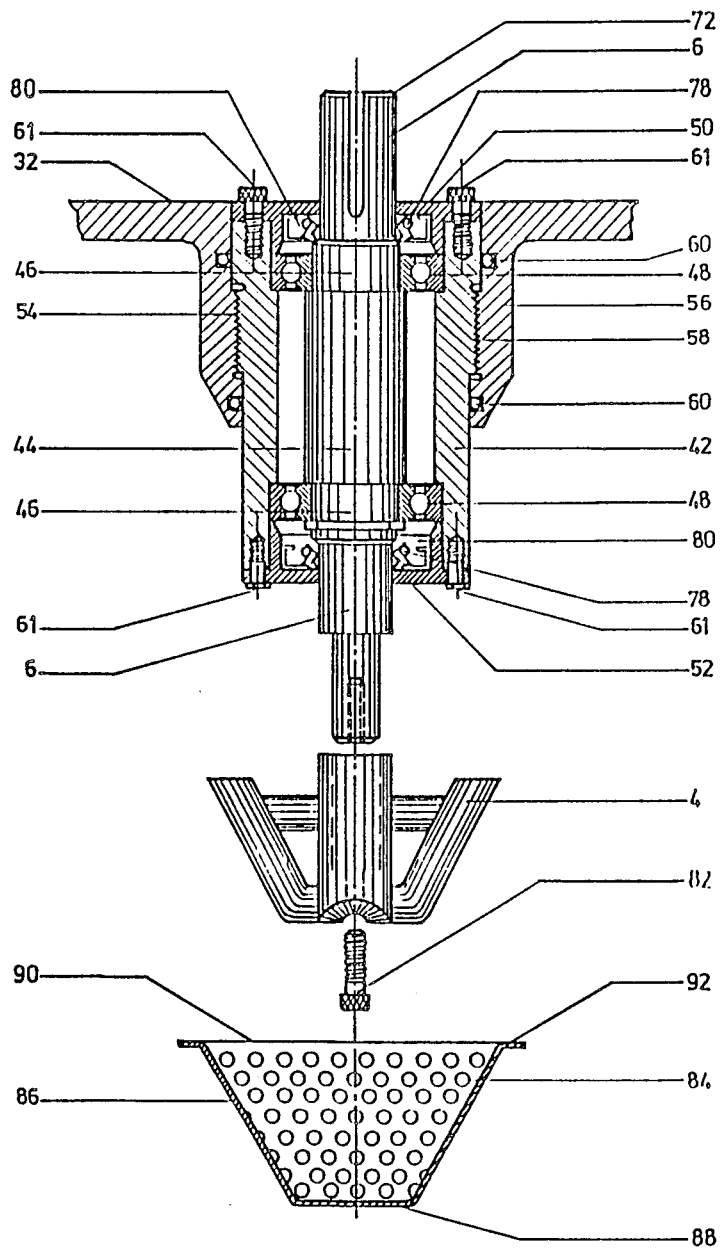
FIG. 3 is an exploded side view of a shaft and impeller with a spindle housing, sleeve and screen shown in secton, said screen being a.variation of a screen shown in FIG. 1.

In FIG. 3, there is shown an impeller and shaft that is mounted in the same manner as the impeller and shaft of FIG. 1. The same reference numerals are used in FIG. 3 to designate those components that are identical to the components of FIG. 1. The main difference between the partial size reduction machine shown in FIG. 3 and that shown in FIG. 1 is in the screens. Circular seals 78 are mounted in annular spaces 80 at either end of the elongated collar 44 in order to reduce the possibility of any dust, dirt or other contamination entering the area of the ball bearings 48. The same seals 78 are used with the size reduction machine 2 of FIG. 1 but were omitted from that figure for ease of illustration.

The impeller 4 is removably affixed to the shaft 6 by a screw 82. The impeller 4 of FIG. 1 is held on the shaft 6 in the same manner except that the screw is not shown. A screen 84 is shown in section and also in an exploded relationship relative to the impeller 4 and shaft 6. When the screen 84 and impeller 4 are in an operating position, they will be in approximately the same position as the screen 14 and impeller 4 of FIG. 1. The screen 84 has a tapered apertured wall 86 with a closed narrow end 88 and an open wide end 90. A circular flange 92 surrounds and extends outwardly from the open wide end 90. In operation, the flange 92 is held in a support 26 (not shown in FIG. 3) in the same manner as the screen 14 of FIG. 1. When comparing the screen 84 with the screen 14, it will be noticed that the screen 84 does not have any cylindrical section. Therefore, when the screen 84 is removed from a size reduction machine and replaced with another screen having a similar shape but a larger wall thickness, the interior height will vary between the two screens and the gap size will decrease, unless the impeller is appropriately adjusted. The impeller 4 of FIG. 3 can be adjusted externally in the same manner as the impeller 4 of FIG. 1. The spindle housing 42, sleeve 56 and top cover plate 32 are shown in section as are the remaining components adjacent to these components.

Figure 4:
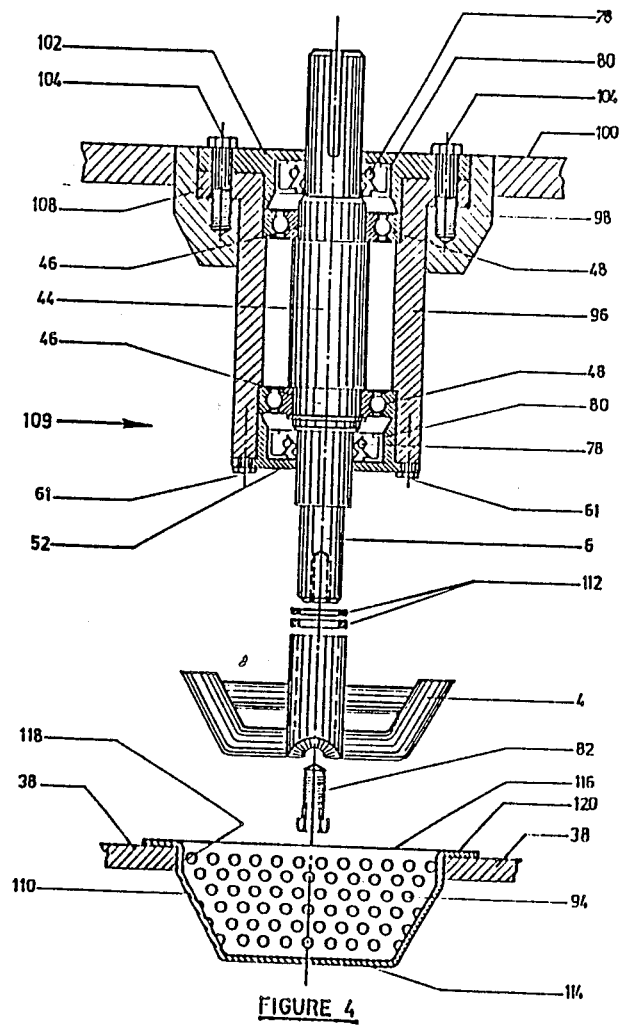
FIG. 4 is a exploded side view of a shaft and impeller with a spindle housing, sleeve and screen shown in section, said spindle housing being immovable, with said screen having a cylindrical section at a wide end.
Figures 5, 6:
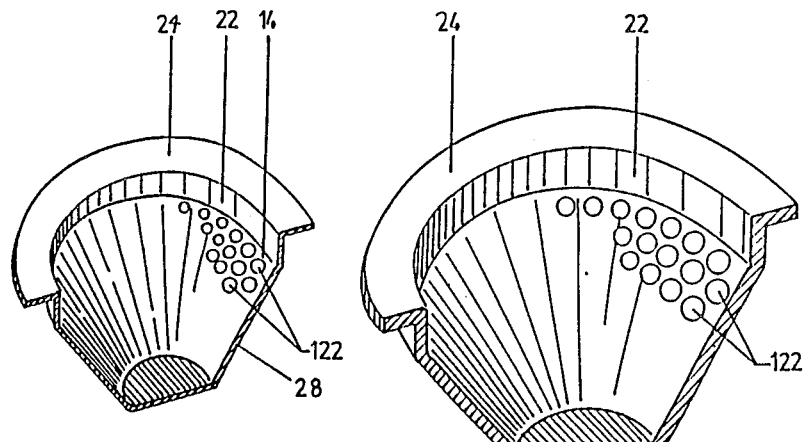
FIGS. 5 to 12 inclusive are perspective views of frusto-conical screens, all having the same outside diameter and inside depth, with apertures of different sizes and shapes, a front portion of said screens being cut away.

In FIG. 4, there is shown a size reduction machine where an impeller 4 and screen 94 are shown in an exploded relationship with a shaft 6. The same reference numerals are used in FIG. 4 to describe components that are the same as those of FIG. 1. While only part of the size reduction machine is shown in FIG. 4, it is virtually identical to the size reduction machine 2 of FIG. 1 except for the manner in which the shaft 6 is mounted and the manner in which the impeller 4 is adjusted. Part of the shaft 6 is rotatably mounted in a spindle housing 96. The shaft 6 has an elongated collar 44 rigidly affixed thereto with narrow ends 46 that are each rotatably mounted in ball bearings 48. The ball bearings are seated within the spindle housing 96, thereby allowing the shaft 6 to rotate relative to said spindle housing. The spindle housing 96 is concentrically partially mounted in a sleeve 98. The sleeve 98 is rigidly affixed to a top cover plate 100. The spindle housing 96 has a cover plate 52 at a lower end and a cover plate 102 at an upper end. Bolts 104 extend through a circular flange 108 on the spindle housing 96 and into the sleeve 98, thereby preventing any movement between the spindle housing 96, the cover plate 102 and the sleeve 98. Seals 78 mounted in annular spaces 80 at either end of the elongated collar 44 reduce the possibility of dust, dirt or other contamination entering the area of the ball bearings 48.

When it is desired to change the gap size, of the size reduction machine 109 shown in FIG. 4, the impeller 4 can be removed from the shaft 6 and one or more spacers 112 can either be inserted onto the shaft 6 or removed from the shaft 6. When more spacers are inserted onto the shaft 6, the impeller will be lower relative to the shaft 6 and the gap 28 will be reduced. When spacers are removed, the impeller will be higher relative to the shaft and the gap 28 will be increased. Of course, the spacers must be the appropriate size in order to adjust the gap by an appropriate amount. The screen 94 has a closed narrow end 114 and an open wide end 116. A cylindrical section 118 is located at said wide end with a circular flange 120 surrounding and extending outwardly from said wide end. It can be seen that the screen 94 has a smaller internal depth than the screen 14 of FIG. 1. A series of screens having the same angle of the tapered wall relative to a plane through the flange 120, the same internal depth and the same outside diameter at a wide end could be designed in relation to the screen 94. Of course, the screens in this series would have apertures of different sizes and shape and the thickness of the tapered wall 110 would be different for all or nearly all of the screens of the series. When any of these screens of the same series are interchanged with one another, on the size reduction machine 109 or the size reduction machine 2, the gap size would remain identical without any adjustment to the impeller.

Referring to FIGS. 5 to 12, inclusive, there are shown numerous variations in the size and shape of apertures 122. All of the screens 14 shown in these figures have a cylindrical section 22 at a wide end 18. Also, it can be seen that as the size of the perforations increases, the wall thickness of the screens also increase. The screens shown in FIGS. 5 to 12 are typical screens and it would be possible to design screens where the wall thickness of the screens did not increase with the size of perforations. In FIGS. 5 to 12, the apertures or perforations 122 are not located in the cylindrical section 22 but only in the tapered wall section 28. In most uses, the apertures are located only in the tapered wall section 28, but, as shown in FIG. 1, the perforations could also be located in the cylindrical section 22. For ease of illustration, the apertures are only partially drawn into the tapered wall 28 but it is to be understood that the apertures would completely cover the tapered wall of each screen 14.

Figures 7, 8:
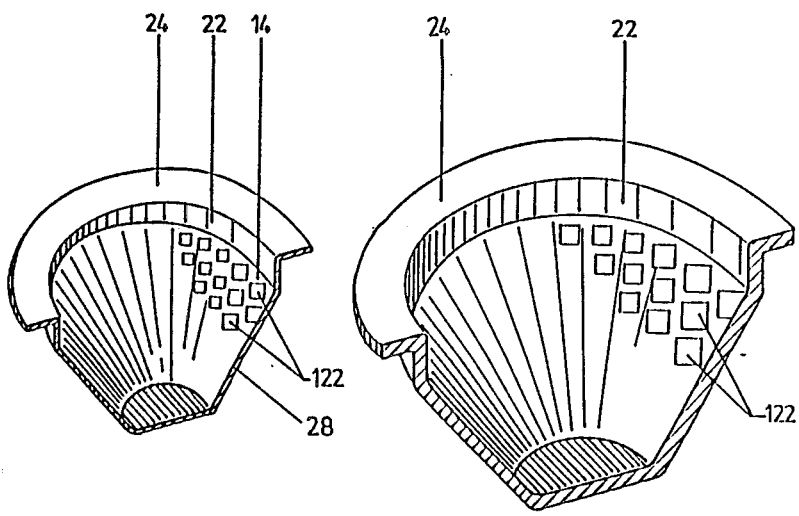
Figure 9:
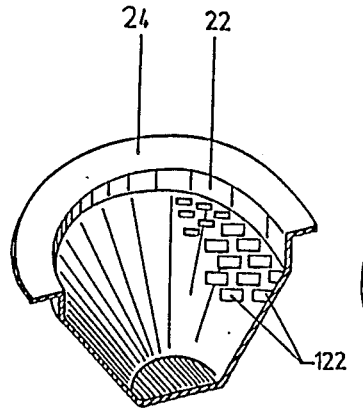
Figure 10:
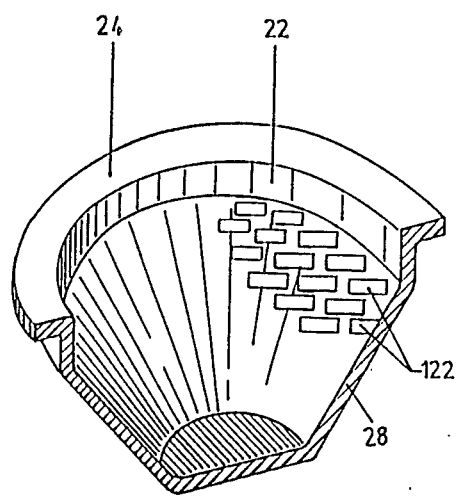
Figure 11:
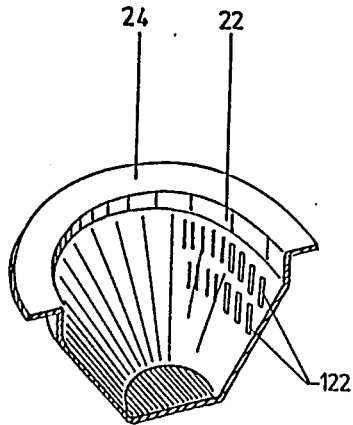
Figure 12:
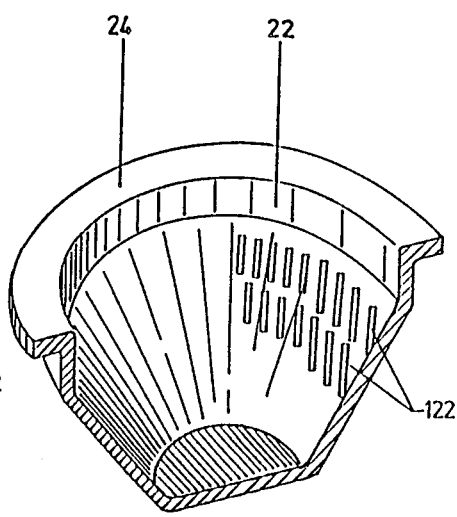

In FIGS. 7 and 8, it can be seen that the apertures 122 have a rectangular shape. in FIGS. 9 and 10, the apertures 122 have longer rectangles than those shown in FIGS. 7 and 8. In FIGS. 11 and 12, the apertures 122 are slotted and a long side of said apertures is parallel to a centre axis of said screens 14.

In FIGS. 5 to 12, it can be seen that the even numbered figures have apertures that are larger than those of the odd nunbered figures. In each case, it can also be seen that the wall thickness of the tapered wall 28 is larger with the large apertures than it is with the small apertures. Numerous other shapes, sizes and orientation of apertures can be used in screens in accordance with the present invention. For example, apertures could be square, diamond-shaped, U-shaped, V-shaped and they could have virtually any orientation relative to a centre axis of the screen. Further, the apertures can have one side that protrudes further into an interior of the screen than another side.

Figure 13:
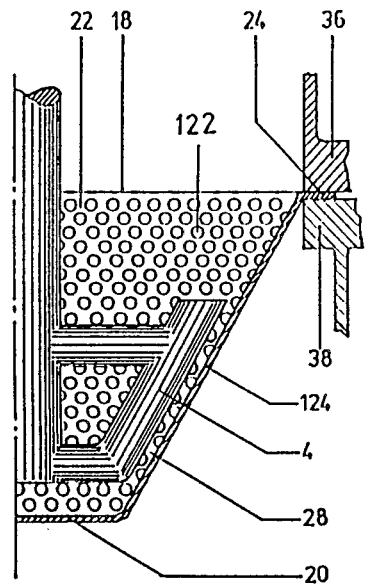
FIG. 13 is a partial sectional side view of a screen mounted in a support, said screen having a relatively narrow wall thickness.
Figure 14:
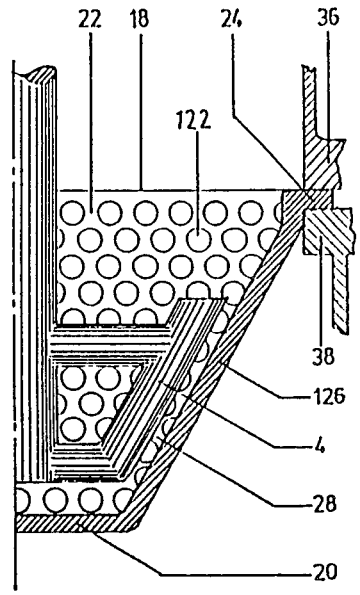
FIG. 14 is a partial sectional side view of a screen mounted in a support, said screen having a relatively large wall thickness.

Referring to FIGS. 13 and 14, there is shown a screen 124 and a screen 126. The screen 124 has smaller apertures 122 as well as a smaller wall thickness than the screen 126. Generally, as the size of the apertures increase in screens of the present invention, the wall thickness required to make the screens also increases. The screens 124, 126 are each mounted in the support 26 with the flange 26 of each screen being located at the same level. Each of the screens 124, 126 has a closed narrow end 20, an open wide end 18 and a cylindrical section 22. Since the wall thickness of the screen 124 is so thin, the cylindrical section 22 is almost non-existent. As the wall thickness increases, the height of the cylindrical section 22 would increase. The impeller 4 is located in the same position in each of the FIGS. 13 and 14. By comparing FIGS. 13 and 14, it can be readily determined that the screens 124, 126 are of the same series. The angle of the tapered wall 28 of each screen relative to the closed end 20 is the same. Of course, the angle of the tapered wall 28 of each screen relative to the cylindrical section 22 is the same, though said angle is different from the angle relative to the closed end 20. Similarly, it can be readily observed or measured that the outside radius (one-half of the diameter) as well as the interior depth of the two screens 124, 126 is the same. Finally, it can be observed that the gap 28 between the edge of the impeller 4 and the interior wall 28 of each screen 124, 126 is also the same.

It is possible to design a series of screens having different material wall thicknesses and sizes and shape of apertures while having the same angle relative to a closed end, the same outside diameter and the same interior depth by including a cylindrical section in the screen. While the cylindrical section could be located at any point in the screen, either at the wide end, the narrow end or any point in the screen, either at the wide end, the narrow end or any location in between, it is most suitable to have the cylindrical section located at the wide end.

It is not absolutely essential that the cylindrical section be exactly cylindrical as long as it is substantially cylindrical by forming an angle of less than 180° with an interior surface of the interior wall section. It is believed that a cylindrical shape is the easiest to work with.

From FIGS. 13 and 14, it can readily be seen that the screens 124 and 126 can be interchanged with one another while maintaining the gap at a constant value, without any adjustments being made to the impeller 4. Further, it can readily be seen that any screens of the same series can be interchanged with one another, while maintaining the same gap size, without adjusting the impeller.

Figure 15:
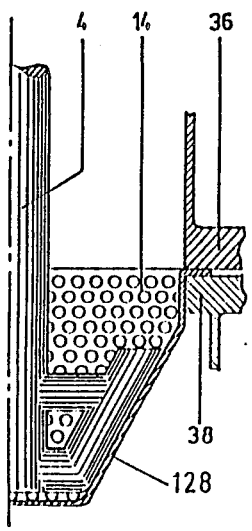
FIG. 15 is a partial side view of an impeller and a screen mounted in a support with a zero gap size.
Figure 16:
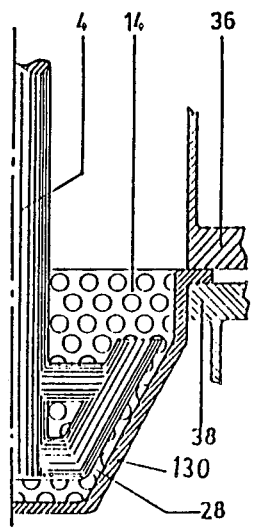
FIG. 16 is a partial side view of an impeller and a screen mounted in a support with a larger gap size than that shown in FIG. 14.
Figure 17:
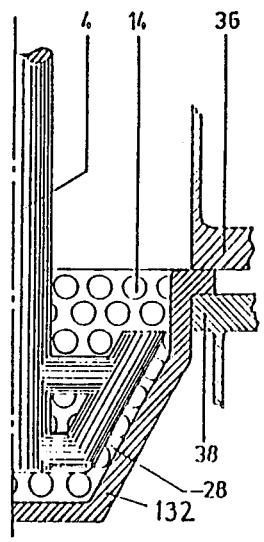
FIG. 17 is a partial side view of an impeller and a screen mounted in a support with a still larger gap size than that shown in FIG. 15.

Referring to FIGS. 15, 16 and 17, it can be seen that screens 128, 130 and 132 respectively have the same angle, outside diameter and interior depth but a different material thickness. Each of these screens could be used interchangeably with the other in the same size reduction machine without adjusting the gap size. However, it can be seen that in FIG. 15, there is a zero gap size in FIG. 16, there is a slightly larger gap size and in FIG. 17, there is a still larger gap size. It can readily be seen from comparing the three figures, that the imepller has been moved steadily upward in order to increase the gap size. Finally, it can be seen that the distance between the closed end of the screen and the impeller increases at a much greater rate than the gap size.

The size of the gap in a size reduction machine is an important parameter in size reduction processes in order to obtain the desired size reduction as well as an appropriate level of throughput. Generally, as the gap size is reduced, more of the motive force of the impeller is utilized in transporting material through the apertures, thereby increasing the throughput. In addition, more force is directed towards the attrition mechanism of grinding instead of the impact mechanism, which might product a finer output product. In some uses, it may be necessary to increase the gap to avoid producing fines or when the particles being treated are heat or attrition sensitive. Usually, the optimum gap size and screen and impeller combination can only be determined empirically when a new product is being processed in a size reduction machine for the first time. For a series of screens designed prior to the present invention, the gap size varied with the wall thickness of the material used to make a particular screen or screens of a series.

With the present invention, the formula for calculating the impeller adjustment is as follows:

$$I = K - \frac{G}{\cos\alpha}$$

where

I is the size of the adjustment of the impeller;
G is the gap size;
$\alpha$ is the angle of the tapered wall of the screen relative to a plane parallel to said wide end; and
K is constant for a particular size of machine.

In machines using a fixed shaft and spacers on the shaft to adjust the gap size, K is equal to the distance from that point on the shaft that a top surface of the impeller abuts when there are no spacers on the shaft to an interior bottom surface of the screen less the height of the impeller. When a size reduction machine has a shaft that is externally adjustable, K is equal to the distance from a reference point on a channel to an interior bottom surface of the screen less the distance from the bottom edge of the impeller to the same reference point.

With this formula, it can readily be seen that the wall thickness of the screen is immaterial in determining the adjustment to the impeller when different screens are used. Therefore, when the interior depth and outside diameter as well as the angle of the screen are constant for all screens of a particular series, the screens can be readily interchanged in the same size reduction machine and the gap size will remain the same, without adjusting the impeller.

It is possible for one size reduction machine to have two hundred different screens that are used interchangeably to process different types or sizes of particles at varying rates of throughput. Also, while the impeller shown in the drawings all have two opposing edges that are angled so that both of said edges are parallel to an interior tapered wall of said screen, it is also possible to have impellers of various shapes depending on the size and type of particles being processed and the speed at which the impeller is rotated. Preferably, the speed of a tip of the impeller ranges from 1 m per second to 75 m per second. Also, the screens used preferably have an open or perforated area ranging from 20 to 65 percent and a wall thickness ranging from 0.2 mm to 5.0 mm. The size of the apertures preferably ranges from 0.1 mm to 20.0 mm. Impellers may be made from round bars, flat bars or solid plates depending on the requirements of a particular use. While preferable speeds, thicknesses and sizes are set out in this paragraph, it would be possible to operate the invention beyond one or more of the ranges stated.

The preferred angle of the tapered wall of the screen relative to a plane through the closed end is 60°. However, any angle of reasonable size can be used. The reason that 60° is chosen is that the relationship between the impeller adjustment and gap size is one-half. When screens are designed with a constant angle, interior depth and outside diameter, the screens will be screens of the same series. For example, one series of screens could have an angle of 60° and another series of screens could have an angle of 45°.

The versatility of existing size reduction machines can be improved by using a series of screens in accordance with the present invention. Even though the gap adjustment must still be made by removing the impeller from the shaft and removing or inserting spacers, many gap adjustments can be eliminated by using a series of screens in accordance with the present invention. This arrangement is shown in FIG. 4. Conversely, advantages can be achieved by using previously known screens with the external adjustment means in accordance with the present invention as shown in FIG. 3. Even though more gap adjustments are required using a known series of screens than by using a series of screens in accordance with the present invention, the external adjustment means makes it much easier and simpler to adjust the gap. Unlike the previous size reduction machines where a spacer or spacers of the exact size required had to be calculated and then located before the gap adjustment could be made, with the external adjustment means of the present invention, an infinite number of gap settings can be achieved without removing the shroud, screen or impeller. While it is advisable, for safety reasons, that gap adjustments only be made when the impeller is at rest, it is even possible with the external adjustment means of the present invention to make adjustments in gap size while the machine is running. This can be particularly useful when attempting to process a different type of product for the first time in order to determine an optimum gap size.

Size reduction is widely used in nearly every type of process industry. However, each particular size reduction process is unique as the manner in which the process operates is dependet on the initial particle size, degree of hardness, size distribution, desired size reduction ratio, throughput rate, temperature and energy consumption. It is known that as the gap sizes reduce between the impeller and the screen, more of the motive force of the impeller is utilized in transporting material to and through the apertures, thereby increasing throughput. In addition, more force is directed towards the attrition mechanism of grinding instead of the impact mechanism which may result in a finer output product. In some processes, it may be necessary to have a relatively large gap size to avoid producing fines or because the product is heat or attrition sensitive. The optimum gap setting, aperture shape and size and impeller shape and size can normally only be determined for a new process by having test runs. With previous size reduction machines, it has often been so difficult to determine the optimum gap size or to adjust the machine once the gap size was determined, that operators run the machine at less than the optimum level.

Numerous variations can be made to the screens or to the external gap adjustment means of the present invention within the scope of the attached claims. For example, the narrow end of the screen could have some perforations placed therein. Further, the cylindrical section could be shaped so that it is not cylindrical so long as it forms an angle of less than 180° with the interior tapered wall. While the circular flange is shown as being normal to the cylindrical section, the flange could be located at any reasonable angle. Various parts of the size reduction machine that are shown as being integral with other parts could be separated and various pats that are shown separately could be made to be integral. Tabs or cutouts could be used on the flange of the screens to ensure that the screen does not rotate relative to the support. The locking mechanism could be varied to ensure that it will not slip. Other variations will be readily apparent to those skilled in the art.

What we claim as our invention is:

1. A series of interchangeable screens for use with a size reduction machine, said machine having an impeller mounted on a rotatable shaft, a power source to rotate said shaft and impeller, said shaft and impeller being located in a channel having an input and output, said channel containing a support, each screen comprising a tapered apertured wall formed into a frusto-conical shape, with a wide end of each screen being open and a narrow end being at least partially closed, each screen having a substantially cylindrical section, said section surrounding and extending from said tapered apertured wall, a circular flange surrounding and extending radially outwardly from said cylindrical section at an end opposite to said tapered wall, each screen being designed to be located in said channel with said flange held rigidly within said support so that any particles passing from said input to each output pass through said screen, each impeller being shaped and mounted so that a gap between an edge of the impeller and a tapered wall of each screen mounted in each support can be maintained substantially constant when said impeller rotates relative to each screen, each screen being independently removable from said machine and replaceable with another screen, said another screen having the same outside diameter at a wide end and the same inside depth as each other screen despite variations between the screens in height of the cylindrical section, in apertured wall thickness and in size and shape of apertures, said gap being maintained at a constant value, if desired, without any adjustments being made to the impeller.

2. A series of screens as claimed in claim 1 wherein each screen can be mounted in said support, so that said particles flow past said cylindrical section before passing through a remainder of each screen.

3. A series of screens as claimed in any one of claims 1 or 2 wherein the narrow end is completely closed.

4. A series of screens as claimed in any one of claims 1 or 2 wherein a height of the cylindrical section varies directly with a thickness of the tapered apertured wall.

5. A series of screens as claimed in any one of claims 1 or 2 wherein the angle of the tapered apertured wall relative to a plane parallel to said wide end is substantially 60°.

6. A series of screens as claimed in any one of claims 1 or 2 wherein the angle of the tapered apertured wall of each screen is angled so that an interior surface thereof is parallel to exterior opposing edges of said impeller.

7. A screen as claimed in any one of claims 1 or 2 wherein a size of the aperture in the tapered wall varies directly with wall thickness of said wall.

* * * * *